(12) United States Patent
David et al.

(10) Patent No.: US 12,312,095 B2
(45) Date of Patent: May 27, 2025

(54) AUXILIARY POWER SYSTEM

(71) Applicant: AIRBUS OPERATIONS, S.L.U., Madrid (ES)

(72) Inventors: Benjamin David, Madrid (ES); Marcos Javier Chiabrando, Madrid (ES); María Cruz Zamarro Martín, Madrid (ES); Francisco Manuel Andreu Fernández, Madrid (ES); Carlos Casado Montero, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 18/523,042

(22) Filed: Nov. 29, 2023

(65) Prior Publication Data

US 2024/0190581 A1 Jun. 13, 2024

(30) Foreign Application Priority Data

Dec. 13, 2022 (EP) .................................... 22383210

(51) Int. Cl.
*B64D 41/00* (2006.01)
*B60L 3/00* (2019.01)
*B60L 50/00* (2019.01)
*F02C 7/26* (2006.01)
*H02J 3/00* (2006.01)

(52) U.S. Cl.
CPC ............ *B64D 41/00* (2013.01); *B60L 3/0092* (2013.01); *B60L 50/00* (2019.02); *F02C 7/26* (2013.01); *H02J 3/0073* (2020.01); *B60L 2200/10* (2013.01); *F05D 2220/76* (2013.01); *F05D 2260/85* (2013.01)

(58) Field of Classification Search
CPC .... F02C 7/277; F02C 7/12; F02C 7/32; F02C 7/26; F02C 7/262; F02C 7/264; F02C 7/266; B64D 41/00; B60R 16/03; H02J 3/0073; B60L 3/0092
See application file for complete search history.

(56) References Cited

U.S. PATENT DOCUMENTS

| 9,963,095 | B2 * | 5/2018 | Huang | .................. F01D 15/10 |
| 10,029,631 | B2 | 7/2018 | Iwashima et al. | |
| 2012/0221157 | A1 * | 8/2012 | Finney | ...................... F02C 7/32 |
| | | | | 700/287 |
| 2015/0042155 | A1 | 2/2015 | Vieillard et al. | |
| 2015/0123463 | A1 * | 5/2015 | Huang | .................. B60R 16/03 |
| | | | | 307/9.1 |

FOREIGN PATENT DOCUMENTS

| CA | 2893436 A1 * | 7/2014 | ............. B64D 41/00 |
| CN | 118182848 A * | 6/2024 | ............ B60L 3/0092 |

(Continued)

OTHER PUBLICATIONS

Search report for EP22383210, dated May 12, 2023, 4 pages.

*Primary Examiner* — Craig Kim
(74) *Attorney, Agent, or Firm* — Nixon & Vanderhye P.C.

(57) ABSTRACT

An auxiliary power generator system for an aircraft including an auxiliary power unit (APU) with dual and fully redundant starter and electrical power generation systems that connects independently to a normal electric network or an emergency electric network of an aircraft. A method for supplying electric power to an aircraft by means of the system.

15 Claims, 3 Drawing Sheets

(56) References Cited

FOREIGN PATENT DOCUMENTS

| | | | | |
|---|---|---|---|---|
| EP | 2228881 | A2 | 9/2010 | |
| EP | 2727838 | A2 | 5/2014 | |
| EP | 2842869 | A1 * | 3/2015 | ............. B64C 13/50 |
| JP | 2015110409 | A * | 6/2015 | ............. B60R 16/03 |
| JP | 6397409 | B2 | 9/2018 | |

* cited by examiner

AUXILIARY POWER SYSTEM

RELATED APPLICATION

This application incorporates by reference and claims priority to European patent application EP 22383210.6, filed Dec. 13, 2022.

TECHNICAL FIELD

The present invention relates to auxiliary power generator systems for aircraft. More particularly, the present invention relates to an auxiliary power system (APU) for aircraft.

BACKGROUND

An Auxiliary Power Unit (APU) is a gas turbine engine which is used in aircraft to provide electrical and/or pneumatic power to various systems and components in the aircraft as an auxiliary or secondary source of power. The APU is generally located in the aircraft fuselage at/or near the tail cone section. The APU allows the aircraft to be autonomous of the external electrical and pneumatic power sources on the ground and in-flight. A typical gas turbine APU for aircraft comprises three main sections: a power section, a load compressor section and a gearbox section. The power section is the gas-generator portion of the engine and produces all the shaft power for the APU. The load compressor section is generally a shaft mounted compressor that provides pneumatic power for the aircraft, although some conventional APUs extract bleed air from the power section compressor top provide pneumatic power. The gearbox transfers power from the main shaft of the APU to an oil-cooled generator that provides electrical power to the aircraft.

APUs have be used to: provide power to an aircraft when the primary engines are not running such as while the aircraft is on ground; temporary power to start the primary engines during normal operations; temporary emergency power during a primary engine-out condition or other emergency situations, and continuous emergency power until aircraft landing. In addition, APUs have be used to replace one main generator failed for dispatch conditions.

According to the prior art, there are known large commercial aircraft that have dual power generators needed to meet power requirements of the aircraft. However, the rationale for providing two generators comes from the normal electrical bus power requirement under normal conditions, which requires both generators to work simultaneously. In addition, these aircraft have a single starter system. Other large commercial aircraft use one generator and a single starter. These known arrangements of generators and starters do not include a dual starter system and do not provide the possibility to use the APU as emergency power source since there is no direct connection to the emergency electrical busbar. These aircraft have a dedicated emergency power source, such as a Ram Air Turbine (RAT).

The RAT is usually connected to an electrical generator to be used as an emergency power source. In case of loss of normal power, the RAT is deployed to power some aircraft systems. The RAT is stowed into the fuselage or wing in normal conditions and is deployed automatically following complete loss of power. Nowadays, APU and RAT are completely separated systems located at separate parts of the aircraft. The APU provides auxiliary power, and the RAT is used as source of emergency power. Both systems generate electrical power through respective electrical power generators.

There are some aircraft architectures where the APU is used as an emergency power source. This is possible due to a legacy overall aircraft architecture (non-fly-by-wire) and requirements demonstrated to have enough compliance with this. However, for ETOPS flight (Extended Operations flight) this aircraft architecture requires the APU to be running in the ETOPS sector.

SUMMARY OF INVENTION

A new architecture is disclosed herein that includes an auxiliary power unit (APU) with dual and fully redundant starter and electrical power generation systems that is configured to connect independently to a normal electric busbar network and to an emergency electric busbar network of an aircraft. In addition. A method is disclosed herein for supplying electric power to an aircraft by means of said system, according to the operating modes of the redundant auxiliary power system, either normal or emergency.

According to a first aspect of the invention, these problems and drawbacks are solved by means of the specific configuration of a redundant auxiliary power system for an aircraft, this system including a dual and fully redundant starter and electrical power generation systems that can connect independently to the normal or emergency electric busbar network of the aircraft. The proposed redundant auxiliary power system supplies electrical and pneumatic power for ground operations and degraded/MMEL (master minimum equipment list) flight operations; and further supplied emergency power in case of LMES (loss of main electrical supply)/TEFO (total engine flame out) and replaces RAT functionality.

A first aspect of the invention provides a redundant auxiliary power system for an aircraft, comprising:
  an Auxiliary Power Unit (APU) for supplying power in an operative mode;
  a normal busbar network and an emergency electric busbar network;
  a normal starter and an emergency starter both configured to independently start up the APU;
  a normal electrical power generator and an emergency electric power generator both configured to generate electric power when the APU is in the operative mode, wherein the normal electric power generator supplies electric power to the normal electric busbar network and the emergency electric power generator supplies electric power to the emergency electric busbar network,
  an electrical power controller configured to control electrical operational parameters of the normal and an emergency electric busbar networks; and
  an APU controller connected to the electrical power controller and configured to control the operative mode of the APU based on data received from the electrical power controller, data related to the aircraft operational parameters, and/or a manually activated signal;
  wherein the normal and the emergency starters are configured to start the APU for independently operating at least one of the normal and the emergency electric power generator; and
  wherein the redundant auxiliary power system is configured to operate according to:
  (i) an emergency mode wherein the APU controller is configured to activate the emergency starter to start the APU, and the emergency electric power generator for supplying electric power to the emergency electric busbar network; and (ii) a normal mode wherein the APU controller is configured to activate: one of the normal or emergency starter to start the APU, and one of the normal or emergency electric power generators to supply electric power to the normal or emergency electric busbar network.

The auxiliary power system comprises an APU that provides standard APU functions including delivering electrical and pneumatic power for ground operations and degraded/MMEL flight operations for an aircraft. Particularly, it has been specified that this APU supplies electric power in an operative mode. The expression "operative mode" of APU is understood as the mode when the APU is working, i.e., has been started.

The redundant auxiliary power system is suitable to be installed in an aircraft and to be connected electrically to the aircraft electric busbar networks.

The aircraft electric busbar networks comprise at least a normal electric busbar network and an emergency electric busbar network, wherein both normal and emergency electric busbar networks are composed by an AC (alternating current) and/or a DC (direct current). The electric busbar networks referred for the redundant auxiliary power system are the electric busbar networks of an aircraft.

The redundant auxiliary power system further comprises two starters, a normal starter and an emergency starter. Each starter is configured to start the APU independently such that the APU can be started by either starter without aid of the other starter. These starters are supplied with electric power by the normal electric busbar network and/or by the emergency electric busbar network. The electric busbar networks can be powered by at least one battery. Either electric busbar network is able to supply sufficient electric power to start either starter. In a particular embodiment, the starters are a DC starter or DC motor.

The redundant auxiliary power system also comprises two electric power generators, a normal electric power generator and an emergency electric power generator. Each electric power generator can be independently connected to the APU and consequently to generate electric power when the APU is in operative mode. Both generators can be mechanically connected to the APU at the same time through a gearbox or can be mechanically connected on demand. The connection between an electric power generator and the APU is provided by means of mechanical means that alternatively can couple and uncouple each electric power generator to the APU. Therefore, the present system allows to couple and uncouple the electric power generator according to the needs of the aircraft in such a way that only one electric power generator can be coupled to the APU when the APU is in operative mode or both can be coupled at the same time to the APU. In addition, the present redundant auxiliary power system is configured to ensure that no failure in one electric power generator can affect to the other electric power generator.

The normal electric power generator is configured to at least connect electrically to the normal electric busbar network for supplying electric power generated. The emergency electric power generator is configured to at least connect electrically to the emergency electric busbar power network for supplying electric power. In addition, the both normal and emergency starter are configured to start up the APU for independently operating at least one of the electric power generators.

The present system is provided with an electrical power controller that controls the electrical operational parameters of both normal and emergency electric busbar networks.

This electrical operational parameters are understood as an indication of the status of each electric busbar network of the aircraft to which the present system supplied electric power. For example, there electrical operational parameters may indicate normal or predefined electric busbar network operation as well as a malfunction in any of the electric busbar network.

The redundant auxiliary power system further comprises an APU controller that controls the APU operation. Specifically, the APU controller is connected to the electrical power controller and controls the operative mode of the APU. The control of the APU is based on data received from the electrical power controller, data related to the aircraft operational parameters, or a manually activated signal. The data received from the electrical power controller is the electrical The redundant auxiliary power system is configured to operate according to an emergency mode or a normal mode, and depending on each operating mode of the system, the APU controller operates in a particular way on the APU.

For an emergency mode, the APU controller activates the emergency starter to start up the APU and the emergency electric power generator for supplying electric power to the emergency electric busbar network. By contrast, for a normal mode, the APU controller activates one of the normal or emergency starter to start up the APU and one of the normal or emergency electric power generators for supplying electric power to the normal or emergency electric busbar network, respectively. That is, for emergency mode it will always be the emergency electric power generator that supplies electric power to the emergency electric busbar network, while in normal mode it can be any of the electric power generators that supply electric power, each one to the respective electric busbar network to which they are connected.

Therefore, the APU controller is configured to selectively actuate one of the starter for starting up the APU and one of the electric power generators for generating electric power. The activation of an electric power generator is understood as the connection of the selected electric power generator to the corresponding electric busbar network of the aircraft to be needed supplied. In a particular embodiment, the APU controller is an engine control box that is power supplied by the emergency electric busbar network. The fact that the engine control box is always connected to the emergency electric busbar network ensures its operation regardless of the operating mode, and remains independent and segregated from the normal electric busbar network.

Advantageously, the present redundant auxiliary power system provides a dual and fully redundant starter configuration thanks to the provision of two starter and a dual and partially redundant electric power generation configuration by means of the provision of two electric power generators connectable to the aircraft electric busbar networks. That is, the emergency electric power generator is dedicated to the emergency electric busbar network and the normal electric power generator may be connected to the normal or emergency electric busbar network. Specifically, one single failure on a starter will not result in a NOGO situation for the present system.

Both starters provided in the present system have the same sizing and characteristics in terms of starting power and they are interchangeable. Additionally, both starter support a normal start mode for ground and degraded/MMEL configuration (no start time performance requirement) and an emergency start mode for safety critical operations requiring fast APU availability to deliver emergency electrical power. In addition, the fact of having two starter, under normal mode conditions, if the normal starter fails, the system makes use of the emergency starter for starting up the APU.

Both electric power generators has the same sizing and characteristics in terms of electric power generation performance and they are redundant. Both electric power generators support normal operations on ground and degraded/MMEL operations in flight covering the power requirements of the normal electric busbar network and an emergency operations if needed. The redundancy provided by these two electric power generators advantageously avoids removing/installing the generator in the system if needs to be reconfigure.

The present redundant auxiliary power system advantageously is able to act as emergency power source and remove the RAT by connecting the emergency electric power generator to the emergency electric busbar network. The removal of the RAT may advantageously provide weight saving and maintenance cost saving.

The system also improves the starting reliability in normal or emergency modes (either on ground or in flight). The failure rate of the starter is the highest contributor to starting failure in the APU, and therefore, the redundancy of the starter (by the provision of two starter) aims at improving the starting reliability figure up to 1E-5, being an indication of the probability of APU start up failure. Comparing with the prior art solutions, without starter redundancy, the APU starting reliability is expected to fall to 1E-4.

Since both redundant equipment (two starter and two electric power generators) could be used alternatively from one flight to another for a normal mode, the life cycle of the starter and generator components may be expected to double, which would represent a maintenance cost reduction for an operator.

In an embodiment, the normal starter and the normal electric power generator are both merged in a same unit that conforms a normal actuating means, and the emergency starter and the emergency electric power generator are merged in a same unit that conforms an emergency actuating means. Both actuating means are understood as a motor configured to start up the APU and to generate electric power to be supplied to the electric busbar networks.

In a particular embodiment, both normal and emergency electric busbar network are configured to be powered by a battery or a plurality of batteries. For ensuring the actuation of the normal or emergency starter, both starter are powered by the emergency electric busbuar network or battery/batteries.

In a particular embodiment, the normal electric power generator is further configured to supply electric power to the emergency electric busbar network, and wherein the APU controller is further configured to activate the normal electric power generator for supplying electric power to either the normal or the emergency electric busbar network according to the normal mode of the redundant auxiliary power system, based on data received from the electrical power controller, data related to the aircraft operational parameters, or a manually activated signal.

According to this embodiment, the normal electric power generator is able to supply electric power to both the normal and the emergency network, by means of selection. In other words, the APU controller is in charge of connecting the normal electric power generator to one of the normal or emergency electric busbar network. Therefore, with the aim to mitigate the certification risk, this configuration proposed to keep the emergency electric power generator to power supply to the emergency electric busbar network and the normal electric power generator configured with the capability to connect to both normal or emergency electric busbar network. This configuration improves the aircraft dispatchability and ensures that one single failure one starter or one electric power generator will not result in a NOGO. The term "NOGO" according to the present invention is related to a required decision to not continue a course of action, in this case said term represent a decision to not continue with the APU starting and/or the electric power generation from the electric power generators.

In another particular embodiment, the emergency electric power generator is further configured to supply electric power to the normal electric busbar network, and wherein the APU controller is further configured to activate the emergency electric power generator for supplying electric power to either the normal or the emergency electric busbar network according to the normal mode of the redundant auxiliary power system, based on data received from the electrical power controller, data related to the aircraft operational parameters, or a manually activated signal.

For this embodiment, the emergency electric power generator is able to supply electric power to both the normal and the emergency network, by means of selection. The APU controller is in charge of connecting the emergency electric power generator to one of the normal or emergency electric busbar network as needed. Both electric power generators are not allowed to be connected at the same time on normal and/or emergency electric busbar network. a single starter (starter) or an electric power generator failure is not considered a NOGO as the present redundant auxiliary power system is able to reconfigure the operating mode. For example, if one of the starter fails, the APU controller is configured to switch to the remaining starter to complete the starting process of the APU. In another example, in case of failure of one generator during operation, the APU controller is configured to isolate the faulty generator and reconfigure to engage the remaining generator. This particular configuration improves the operability for the APU.

Therefore, the redundancy that the present system also offers the possibility to have a GO situation in case of a single failure of one electric power generator, because the other generator takes over.

In a particular embodiment, the APU controller is configured to be powered supplied by the emergency electric busbar network in any case to remain independent and segregated from the normal electric busbar network.

In an embodiment, the electrical power controller is further configured to monitor the operating time of each electric power generator, and wherein according to the normal mode, the APU controller is configured to activate the electric power generator that has operated for shortest time based on the operating time data monitored by the electrical power controller.

By monitoring the operating time (usage time) of each electric power generator, the present system has the option to select the generator that has been used the least to operate according to the normal mode. Advantageously, the present system avoids excessive wear on one of the electric power generators and shares the performance between the two electric power generators.

In an embodiment, the electrical power controller is further configured to monitor the operation of the starter, such that upon a malfunction in one of the starter, the APU controller is configured to deactivate the activated starter and activate the other starter to start up the APU. This advantageously would never lead to a NOGO decision as a result of a failure of one starter.

In an embodiment, the electrical power controller is further configured to monitor the operation of the electric power generators, such that upon a malfunction in one of the electric power generators, the APU controller is configured to deactivate the activated electric power generator and activate the other electric power generator for electric power supply. This advantageously would never lead to a NOGO decision as a result of a failure of one electric power generator. For example, in case of failure of one electric power generator before aircraft taking-off, the electrical power controller is able to detect it, report it to the centralized maintenance system and Flight Warning System, and then the system will be reconfigured accordingly (manually or automatically by means of the APU controller).

The monitoring performed by the electrical power controller advantageously allows the present system to reconfigure itself automatically and autonomously and guarantees the availability of the starting and generating functions for the emergency electric network.

In a particular embodiment, the auxiliary power system is configured to operate according to the emergency mode when the APU controller receives a signal related to Total Engine Flame Out "TEFO" or Loss of Main Electrical Supply "LMES", or the normal mode when the APU controller does not receive instructions for emergency mode.

That is, the emergency mode is understood as the operating mode that is instructed to the APU controller when TEFO or LMES occurs. By contrast, the normal mode is understood as the operating mode when there are no emergency mode instructions.

In an embodiment, the redundant auxiliary power system comprises a starter power unit for each starter, these starter power units being power supplied by the emergency electric busbar network. These starter power units are a power converters in charge of converting low voltage DC to high voltage DC. The use of the starter power units would be necessary in case a high voltage battery (HVDC BATT) would not be available or certifiable to supply an emergency electric power.

According to the present invention, any starter could perform a normal or an emergency start-up, thus, the choice between them depends on the aircraft operation (normal mode or emergency mode), and the difference between the normal and emergency start up is basically a faster and more powerful start up for emergency mode.

In a second inventive aspect, the present invention provides an aircraft comprising a redundant auxiliary power system according to the first inventive aspect. In particular, the redundant auxiliary power system is arranged at the rear end or tail cone of the aircraft.

In a third inventive aspect, the present invention provides a method for supplying electric power to an aircraft by means of a redundant auxiliary power system according to the first inventive aspect, wherein if the redundant auxiliary power system is operated according to an emergency mode, the method comprises: activating the emergency starter by the APU controller to start up the APU; and activating the emergency electric power generator by the APU controller for supplying electric power to the emergency electric busbar network.

If the present system is instructed to operate in emergency mode, the APU controller activates the emergency starter to start up the APU, and once the APU has been started up, then the APU controller activates the emergency electric power generator for supplying electric power to the emergency electric busbar network.

In a fourth inventive aspect, the present invention provides a method for supplying electric power to an aircraft by means of a redundant auxiliary power system according to the first inventive aspect, wherein if the redundant auxiliary power system is operated according to a normal mode, the method comprises: activating one of the normal or emergency starter by the APU controller to start up the APU, and activating one of the normal or emergency electric power generators by the APU controller for supplying electric power to the normal or emergency electric busbar network, respectively.

When the present system is not instructed with an emergency mode, the system operates in normal mode so that the APU controller activates any of the starter to start up the APU, and once the APU has been started up, then the APU controller activates one of the electric power generator for supplying electric power to the electric busbar network respectively. For the normal mode, the corresponding electric power generator will be activated depending on the electric busbar network to be supplied.

Although a particular electric power generator is selected according to the operating mode of the system, both electric power generators may be already connected to the APU so that when the APU is started up by means of the starter, the two electric power generators begin to run and the already selected electric power generator is then connected to the corresponding electric busbar network. Specifically, the APU is first started up and once 100% RPM is reached, then the selected electric power generator is connected to the electric busbar network concerned.

The present method provides the advantage to supply electric power to an aircraft networks irrespective of the operation mode (normal or emergency) and regardless of whether any starter fails.

In a particular embodiment, if the normal electric power generator is activated in step a), the method further comprises deciding whether the normal electric power generator supplies electric power to the normal or emergency electric busbar network in the aircraft. This is possible thanks to the particular configuration wherein the normal electric power generator can be connected to the normal or emergency electric busbar network to supply electric power to any of them.

In a particular embodiment, wherein if the emergency electric power generator is activated in step a), the method further comprises deciding whether the emergency electric power generator supplies electric power to the normal or emergency electric busbar network in the aircraft. This is possible thanks to the particular configuration wherein the emergency electric power generator can be connected to the normal or emergency electric busbar network to supply electric power to any of them.

In an embodiment, the method comprises activating both electric power generators so that one of the electric busbar network is power supplied by one of the generator and the other electric busbar network is power supplied by the other generator. In this particular embodiment, the two electric power generators are connected to the electric busbar networks at the same time.

In another embodiment, the method further comprising monitoring the operating time of the electric power generators by the electrical power controller, wherein in step b), the APU controller activates the electric power generator based on the operating time data received from the electrical power controller.

In an embodiment, upon a malfunction of the activated starter, the APU controller deactivates the activated starter and activates the other starter to start up the APU; and/or upon a malfunction of the activated electric power generator, the APU controller deactivates the activated electric power generator and activates the other electric power generator for electric power supply.

DESCRIPTION OF THE DRAWINGS

These and other features and advantages of the invention will be more clearly understood based on the following detailed description of a preferred embodiment given only by way of illustrative and non-limiting example in reference to the attached drawings.

DETAILED DESCRIPTION OF THE INVENTION

Figure 1:
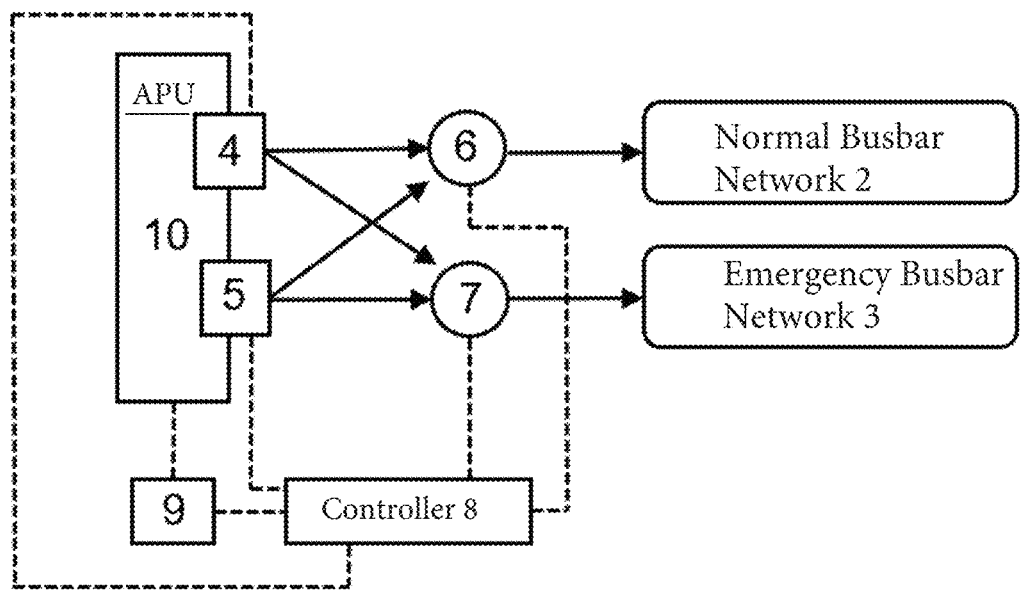
FIG. 1 schematically shows a first embodiment of the architecture of a redundant auxiliary power system according to the present invention.

The present invention discloses according to FIGS. 1 to 4 a redundant auxiliary power system for supplying electric power to aircraft electric busbar networks (2, 3) according to an operating mode, normal mode or emergency mode. The emergency mode is understood as the operating mode of the redundant auxiliary power system when receive instructions related to Total Engine Flame Out "TEFO" or Loss of Main Electrical Supply "LMES"; and the normal mode is understood as the preset operating mode whenever there are no instructions to operate according to the emergency mode. Therefore, a normal mode will be operated when there are not instructions to operate in emergency mode.

The system comprises an APU (10) for supplying power in an operative mode. The system also comprises a normal electric busbar network (2) and an emergency electric busbar network (3) that corresponds to the electric busbar networks of an aircraft (1). That is, the present system is connected to the electric busbar networks of the aircraft when boarding and settling into the aircraft (1). The system also comprises two starter, a normal (4) and an emergency (5) starter, to independently start up the APU (10) as necessary; and two electric power generators, a normal (6) and emergency (7) electric power generators to generate electric power when the APU (10) is in the operative mode. The normal (4) and emergency (5) starter are both configured to start up the APU (10) for independently operating at least one of the normal (6) and emergency (7) electric power generator.

FIG. 1 shows a first embodiment of the redundant auxiliary power system wherein the normal (6) electric power generator is provided to supply electric power to the normal (2) electric busbar network whilst the emergency (7) electric power generator is provided to supply electric power to the emergency (3) electric busbar network. Therefore, each electric power generator (6, 7) is intended to be connected to a particular electric busbar network (2, 3). The configuration of this first embodiment provides a fully redundancy for APU startup. This embodiment is provided when certification risks have been identified and the redundant auxiliary power system provides fully redundancy of the starter function only, with the normal (6) electric power generator dedicated to the normal (2) electric busbar network and the emergency (7) electric power generator dedicated to the emergency (3) electric busbar network.

Figure 2:
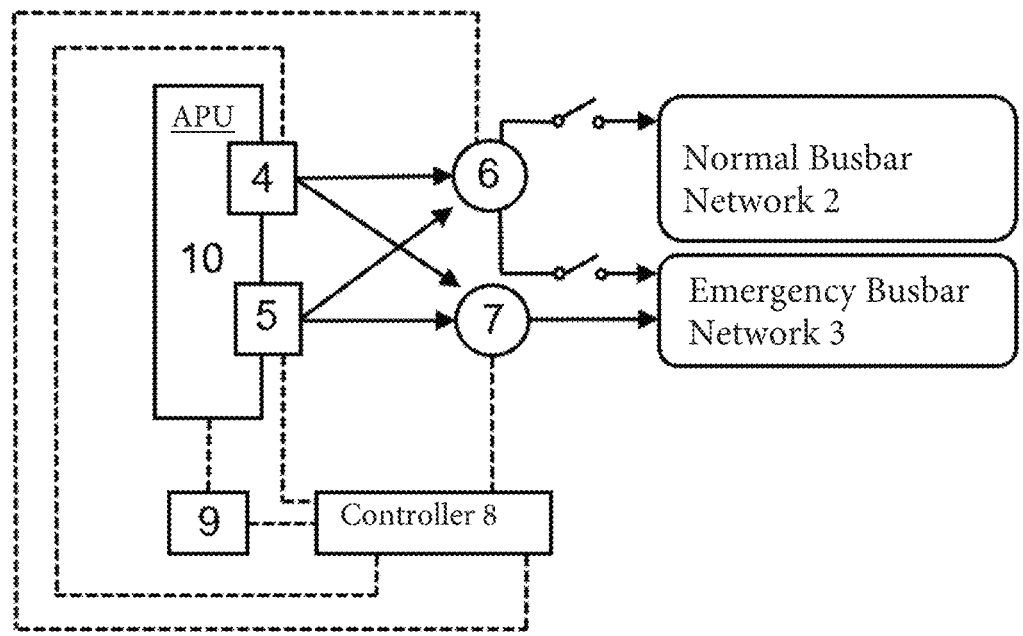
FIG. 2 schematically shows a second embodiment of the architecture of a redundant auxiliary power system according to the present invention.

FIG. 2 shows a second embodiment of the redundant auxiliary power system wherein the normal (6) electric power generator is provided to selectively supply electric power to both normal (2) and emergency (3) electric busbar networks whilst the emergency (7) electric power generator remains to supply electric power to the emergency (3) electric busbar network. The configuration of this second embodiment provides a fully redundancy for APU startup and partial redundancy for electric power generation since only provides redundancy in the electric power generation for supplying power to the normal (2) electric busbar network.

Figure 3:
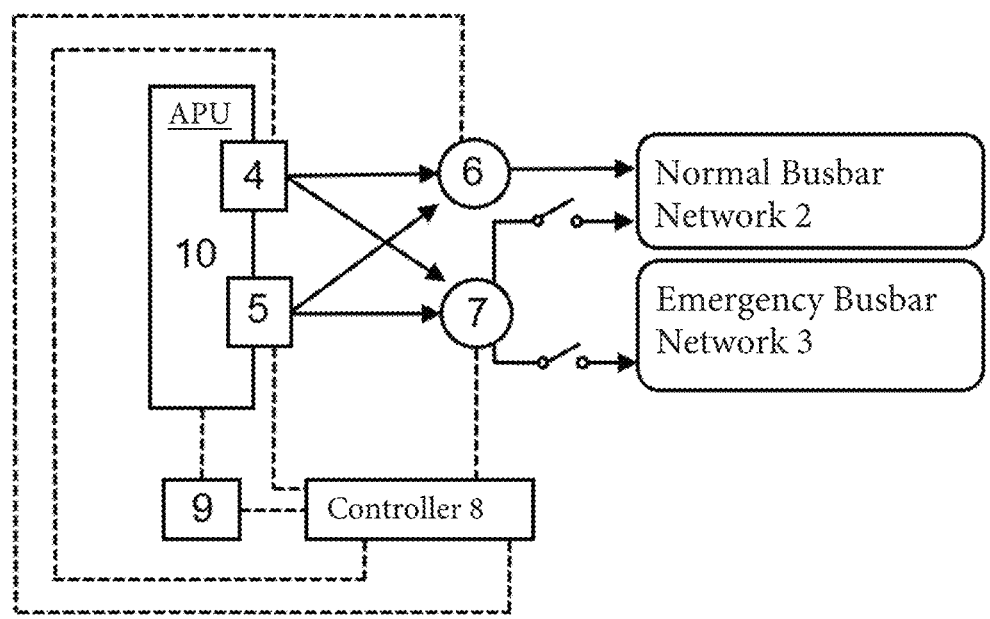
FIG. 3 schematically shows a third embodiment of the architecture of a redundant auxiliary power system according to the present invention.

FIG. 3 shows a third embodiment of the redundant auxiliary power system wherein the normal (6) electric power generator is provided to supply electric power to the normal (2) electric busbar network whilst the emergency (7) electric power generator is provided to selectively supply electric power to both normal (2) and emergency (3) electric busbar networks. The configuration of this third embodiment provides a fully redundancy for APU startup and partial redundancy for electric power generation since only provides redundancy in the electric power generation for supplying power to the emergency (3) electric busbar network.

Figure 4:
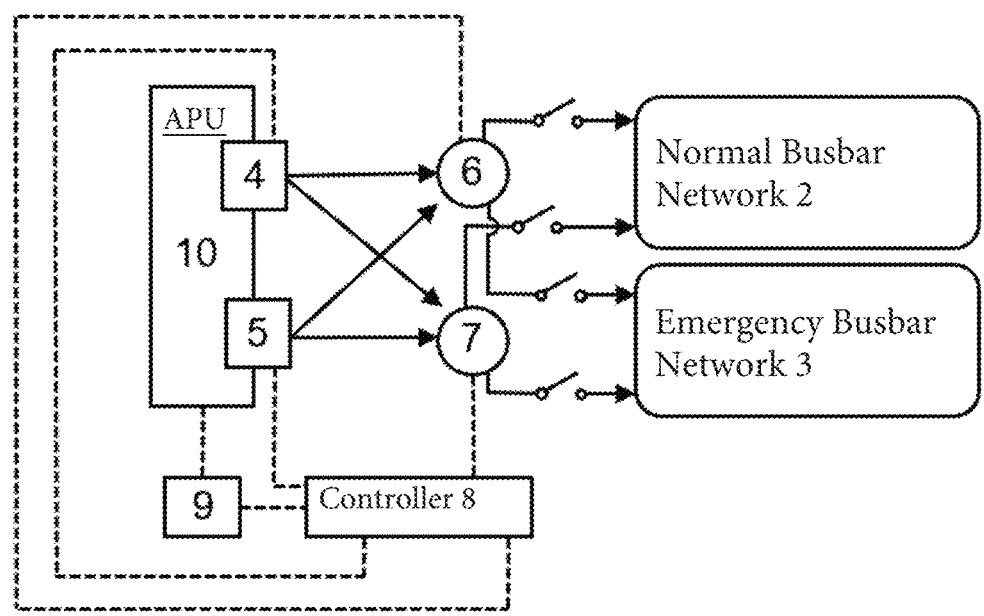
FIG. 4 schematically shows a fourth embodiment of the architecture of a redundant auxiliary power system according to the present invention.

FIG. 4 shows a fourth embodiment of the redundant auxiliary power system wherein both normal (6) and emergency (7) electric power generators are configured to selectively supply electric power to both normal (2) and emergency (3) electric busbar networks. The configuration of this fourth embodiment provides a fully redundancy for both the starting up of the APU (10) and electric power generation.

The redundant auxiliary power system shown in said FIGS. 1-4 further comprises an electrical power controller (8) that controls the electrical operational parameters of both normal (2) and emergency (3) electric busbar networks. Moreover, the electrical power controller (8) is also configured to monitor the operating time of each electric power generator (6, 7), and to monitor the operation of both starter (4, 5) and electric power generators (6, 7) with the aim to detect a malfunction in any of them.

Furthermore, the system comprises an APU controller (9) in data communication with the electrical power controller (8) and being configured to control the operative mode of the APU (10) according to data received from the electrical power controller (8), data related to the aircraft operational parameters or a manually activated signal. That is, the APU controller (9) operated the APU (10) based on normal or emergency mode that may be instructed from the electrical power controller (8) or a manually activated signal or may be determined from received data related to aircraft operational parameters.

The redundant auxiliary power system is able to reconfigure itself automatically and autonomously thanks to the electrical power controller (8) that confirms the expected configuration with the APU controller (9), or manually with specific crew action, to ensure the availability of a starter and electric power generator for the normal (2) or emergency (3) electric busbar network.

The electrical connection between the electrical power controller (8) and the APU controller (9) and the APU (10), starter (4, 5) and electric power generators (6, 7) are indicated with dashed lines in FIGS. 1 to 4.

In these embodiments shown in FIGS. 1 to 4, the APU controller (9) is an engine control box as a full-authority digital electronic controller in charge of the APU logic for all modes of the APU operations, and control of the automatic shutdown, among others. The engine control box controls the normal (4) and emergency (5) starter, and the starter (4, 5) engages if an air intake (also provided in the system) is fully open and the starter (4, 5) is in starting condition. This engine control box remains supplied on the emergency electric busbar network independent and segregated from the normal electric busbar network to ensure the start-up of the APU (10). As well as this engine control box will always be able to decide the configuration to be applied depending on the health status of the redundant auxiliary power system and the electric busbar networks. The engine control box is in charge of computing if an emergency or normal start up is required depending on the needs.

Specifically, the redundant auxiliary power system is configured to operate according to an emergency mode or a normal mode. According to FIGS. 1-4 and for an emergency mode, the APU controller (9) is configured to activate the emergency (5) starter to start up the APU (10) and the emergency (7) electric power generator for supplying electric power to the emergency (3) electric. However, for a normal mode, the operation of the APU controller varies between FIGS. 1-4.

According to FIG. 1 and for the normal mode, the APU controller (9) is configured to activate one of the normal (4) or emergency (5) starter to start up the APU (10) and one of the normal (6) or emergency (7) electric power generators for supplying electric power to the corresponding normal (2) or emergency (3) electric busbar network. For example, if power need to be supplied to the normal (2) electric busbar network, the normal (6) electric power generator would be activated by the APU controller (9), as well as if it is necessary to supply power to the emergency (3) electric busbar network the emergency (7) electric power generator would be activated by the APU controller (9).

According to FIG. 2 and for the normal mode, the APU controller (9) is configured to activate one of the normal (4) or emergency (5) starter to start up the APU (10) and one of the normal (6) or emergency (7) electric power generators for supplying electric power to the emergency (3) electric busbar network or the normal (6) electric power generator for supplying electric power to the normal (2) electric busbar network. For example, if power needs to be supplied to the normal (2) electric busbar network, the normal (6) electric power generator would be activated by the APU controller (9). However, if it is necessary to supply power to the emergency (3) electric busbar network any one of the normal (6) and emergency (7) electric power generators would be activated by the APU controller (9). In the process of supplying power to the emergency (3) electric busbar network in normal mode, if the normal (6) electric power generator has been activated and the electrical power controller (8) detects a malfunction in this normal (6) electric power generator, the electrical power controller (8) notifies of this to the APU controller (9) for the APU controller (9) to deactivate the normal (6) electric power generator and activate the emergency (7) electric power generator for supplying power to the emergency (3) electric busbar network. The same will be apply assuming that it is first the emergency (7) electric power generator activated, so that in case of failure, the normal (6) electric power generator will be then activated for supplying power to the emergency (3) electric busbar network.

According to FIG. 3 and for the normal mode, the APU controller (9) is configured to activate one of the normal (4) or emergency (5) starter to start up the APU (10) and one of the normal (6) or emergency (7) electric power generators for supplying electric power to the normal (2) electric busbar network or the emergency (7) electric power generator for supplying electric power to the emergency (3) electric busbar network. For example, if power needs to be supplied to the emergency (3) electric busbar network, the emergency (7) electric power generator would be activated by the APU controller (9). However, if it is necessary to supply power to the normal (2) electric busbar network any one of the normal (6) and emergency (7) electric power generators would be activated by the APU controller (9). In the process of supplying power to the normal (2) electric busbar network in normal mode, if the normal (6) electric power generator has been activated and the electrical power controller (8) detects a malfunction in this normal (6) electric power generator, the electrical power controller (8) notifies of this to the APU controller (9) for the APU controller (9) to deactivate the normal (6) electric power generator and activate the emergency (7) electric power generator for supplying power to the normal (2) electric busbar network. The same will be apply assuming that it is first the emergency (7) electric power generator activated, so that in case of failure, the normal (6) electric power generator will be then activated for supplying power to the normal (2) electric busbar network.

According to FIG. 4 and for the normal mode, the APU controller (9) is configured to activate one of the normal (4) or emergency (5) starter to start up the APU (10) and one of the normal (6) or emergency (7) electric power generators for supplying electric power to any one of the normal (2) or emergency (3) electric busbar network. For example, if power needs to be supplied to the emergency (3) electric busbar network, any one of the two electric power generators (6, 7) would be activated by the APU controller (9). However, if it is necessary to supply power to the normal (2) electric busbar network also any one of the normal (6) and emergency (7) electric power generators would be activated by the APU controller (9).

In the process of supplying power to the normal (2) electric busbar network in normal mode according to FIG. 4, if the normal (6) electric power generator has been activated and the electrical power controller (8) detects a malfunction in this normal (6) electric power generator, the electrical power controller (8) notifies of this to the APU controller (9) for the APU controller (9) to deactivate the normal (6) electric power generator and activate the emergency (7) electric power generator for supplying power to the normal (2) electric busbar network. The same will be apply assuming that it is first the emergency (7) electric power generator activated, so that in case of failure, the normal (6) electric power generator will be then activated for supplying power to the normal (2) electric busbar network. On the other hand, in the process of supplying power to the emergency (3) electric busbar network in normal mode, if the normal (6) electric power generator has been activated and the electrical power controller (8) detects a malfunction in this normal (6) electric power generator, the electrical power controller (8)

notifies of this to the APU controller (9) for the APU controller (9) to deactivate the normal (6) electric power generator and activate the emergency (7) electric power generator for supplying power to the emergency (3) electric busbar network. The same will be apply assuming that it is first the emergency (7) electric power generator activated, so that in case of failure, the normal (6) electric power generator will be then activated for supplying power to the emergency (3) electric busbar network.

The APU controller (9) is configured to selectively actuate the starter (4, 5) and the electric power generators (6, 7) according to the operating mode (normal or emergency). In addition, the APU controller (8) take into account data received from the electrical power controller (8) for example informing about a failure in any starter (4, 5) or electric power generator (6, 7) for reconfiguring the operation of the system. In addition, the APU controller (9) may receive aircraft operational parameters which can condition a particular operation of the system such as informing about the need to supply electric power to a specific electric busbar network (2, 3), so that the APU controller (9) reconfigures accordingly. Lastly, the APU controller (9) may be also instructed by a manually activated signal to operate according to this specific operating mode i.e. the need to supply electric power to a specific electric busbar network.

In short, the above embodiments described proposes a redundant auxiliary power system for an aircraft so that in the event of a failure in the starting up and/or electric power generation the system reacts so as not to result in a NOGO situation.

Below it is disclosed examples of methods for supplying electric power to an aircraft (1) by means of a redundant auxiliary power system according to the embodiments described above, when the aircraft (1) is on ground or in flight.

According to the redundant auxiliary power system of any one of the above embodiments (FIGS. 1-4), the method comprises the following steps:
if the redundant auxiliary power system is operated according to an emergency mode:
activating the emergency (5) starter by the APU controller (9) to start up the APU (10); and
activating the emergency (7) electric power generator by the APU controller (9) for supplying electric power to the emergency (3) electric busbar network; or
if the redundant auxiliary power system is operated according to a normal mode:
activating one of the normal (4) or emergency (5) starter by the APU controller (9) to start up the APU (10), and
activating one of the normal (6) or emergency (7) electric power generators by the APU controller (9) for supplying electric power to the normal (2) or emergency (3) electric busbar network, respectively.

The present redundant auxiliary power system is configured to operate in normal mode by default unless it is notified to operate according to emergency mode.

For the normal mode, the activation of one of the starter (4, 5) is indiscriminate while the activation of one electric power generator (6, 7) will depend on the electric busbar network (2, 3) to be supplied.

For example and according to the first embodiment (FIG. 1), if the APU controller (9) receives an indication from the electrical power controller (8), from data of the aircraft or from a manually activated signal about supplying electric power to a particular electric busbar network, the APU controller (9) activates the corresponding electric power generator (6, 7) for supplying electric power to said electric busbar network.

According to the second embodiment (FIG. 2), if power needs to be supplied to the emergency (3) electric busbar network, in step d) the APU controller (9) may activate any one of the electric power generators (6, 7) for supplying electric power to the emergency (3) electric busbar network. On the other hand, if power needs to be supplied to the normal (2) electric busbar network, in step d) the APU controller (9) activates the normal (6) electric power generator since it is the only one intended to supply electric power to the normal (2) electric busbar network according to the normal mode.

Depending on the need to supply one or the other electric busbar network, this is notified to the APU controller (9) so that the APU controller (9) can operate accordingly.

According to the third embodiment (FIG. 3), if power needs to be supplied to the normal (2) electric busbar network, in step d) the APU controller (9) may activate any one of the electric power generators (6, 7) for supplying electric power to the normal (2) electric busbar network. On the other hand, if power needs to be supplied to the emergency (3) electric busbar network, in step d) the APU controller (9) activates the emergency (7) electric power generator since it is the only one intended to supply electric power to the emergency (3) electric busbar network according to the normal mode.

According to the fourth embodiment (FIG. 4), if power needs to be supplied to the normal (2) electric busbar network, in step d) the APU controller (9) may activate any one of the electric power generators (6, 7) for supplying electric power to the normal (2) electric busbar network. As well as, if power needs to be supplied to the emergency (3) electric busbar network, in step d) the APU controller (9) may activate any one of the electric power generators (6, 7) for supplying electric power to the emergency (3) electric busbar network.

Moreover, as the electrical power controller (8) monitors the operating time of the electric power generators (6, 7), the electrical power controller (8) gives this information related to the operating time of each generator to the APU controller (9) and the APU controller (9) activates the electric power generator (6, 7) whose previous operating time is less. In this sense, in step d) when the APU controller (9) has the possibility to activate any one of the electric power generators (6, 7), the APU controller (9) activates the electric power generator (6, 7) with the shortest operating time based on the information provided by the electrical power controller (8).

The method further comprises the step of monitoring the operation of the starter (4, 5) and/or the electric power generators (6, 7) by the electrical power controller (8). In this way, upon a malfunction of the activated starter (4, 5), the electrical power controller (8) notifies of this to the APU controller (9) and the APU controller (9) deactivates the activated starter (4, 5) and activates the other starter (4, 5) to start up the APU (10). Furthermore, upon a malfunction of the activated electric power generator (6, 7), the electrical power controller (8) notifies of this to the APU controller (9) and the APU controller (9) deactivates the activated electric power generator (6, 7) and activates the other electric power generator (6, 7) for electric power supply, for the cases where the APU controller (9) has the possibility to choose between two electric power generators (6, 7) to supply electric power to a specific electric busbar network (2, 3).

Any of the above examples of the method further comprises before step a) or c) determining a starting up mode between normal or emergency based on data that the APU controller (9) receives.

Figure 5:
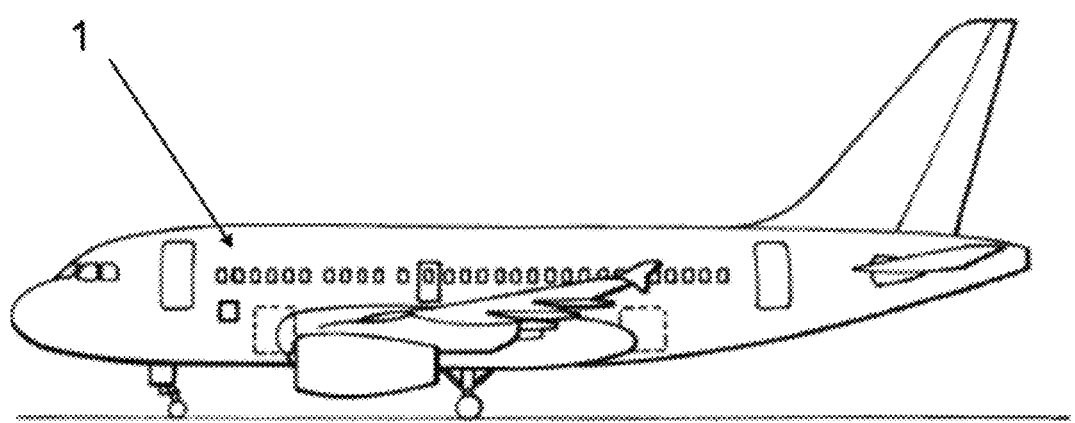
FIG. 5 schematically shows an aircraft according to the present invention.

FIG. 5 shows an aircraft (1) comprising a redundant auxiliary power system according to any one of the embodiments disclosed above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A redundant auxiliary power system for an aircraft comprising:
   an auxiliary power unit (APU) for supplying power to the aircraft;
   a normal electric busbar network in the aircraft;
   an emergency electric busbar network in the aircraft;
   a normal starter in the aircraft configured to start the APU;
   an emergency starter in the aircraft configured to start the APU;
   a normal electric power generator in the aircraft configured to be driven by the APU to generate electrical power supplied to the normal electric busbar; and
   an emergency electric power generator in the aircraft configured to be driven by the APU to generate electric power supplied to the emergency busbar network;
   an electrical power controller in the aircraft configured to control electrical operational parameters of the normal electric busbar network and the emergency electric busbar networks; and
   an APU controller in the aircraft operatively connected to the electrical power controller and configured to control the APU to selectively operate in a normal mode and an emergency mode based information received by the APU controller, wherein the information is contained in at least one of: data received by the APU controller from the electrical power controller, data received by the APU controller and that is indicative of aircraft operational parameters or a signal received by the APU controller from a manually activated device;
   wherein the normal starter and the emergency starter are each configured to start the APU to operate the normal electric power generator and/or the emergency electric power generator; and
   wherein the redundant auxiliary power system is configured to operate in:
      the emergency mode during which the APU controller and the electrical power controller are jointly configured to activate the emergency starter to start the APU and activate the emergency electric power generator to supply electric power to the emergency electric busbar network; and
      in the normal mode during which the APU controller is configured to select the normal starter or the emergency starter to start the APU; select the normal electric power generator or the emergency electric power generator, and select whether power from the normal or emergency electric power generator is to be applied to the normal electric busbar network or the emergency electric busbar network.

2. The redundant auxiliary power system according to claim 1, wherein the normal electric power generator is configured to supply electric power to the emergency electric busbar network,
   wherein the APU controller is configured to activate the normal electric power generator to supply electric power to the normal emergency busbar network or the emergency electric busbar network while operating in the normal mode of the redundant auxiliary power system, and
   wherein the activation by the APU controller is based on the data received from the electrical power controller, data related to the aircraft operational parameters, or a manually activated signal.

3. The redundant auxiliary power system according to claim 1, wherein the emergency electric power generator is configured to supply electric power to the normal electric busbar network,
   wherein the APU controller is configured to activate the emergency electric power generator to supply electric power to the normal electric busbar network or the emergency electric busbar network while operating in the normal mode of the redundant auxiliary power system, and
   wherein the activation by the APU controller is based on data received from the electrical power controller, data related to the aircraft operational parameters, or a manually activated signal.

4. The redundant auxiliary power system according to claim 1, wherein the electrical power controller is configured to monitor an operating time of each of the normal electric power generator and the emergency power generator,
   wherein while in the normal mode, the APU controller is configured to activate the normal electric power generator or the emergency power generator based on which has operated for a shortest time based on the operating time monitored by the electrical power controller.

5. The redundant auxiliary power system according to claim 1, wherein the electrical power controller is configured to detect a malfunction in the normal starter and in the emergency starter, and
   the APU controller is configured to deactivate the normal starter in response to a signal from the electrical power controller indicating a malfunction in the normal starter and deactivate the emergency starter in response to a signal from the electrical power controller indicating a malfunction in the emergency starter.

6. The redundant auxiliary power system according to claim 1, wherein the electrical power controller is configured to detect a malfunction in the normal electric power generator and the emergency power generator, and
   the APU controller is configured to deactivate the normal electric power generator to a signal from the electrical power controller indicating a malfunction in the normal electric power generator, and deactivate the emergency electric power generator in response to a signal from the electrical power controller indicating a malfunction in the emergency power generator.

7. The redundant auxiliary power system according to claim 1, wherein the auxiliary power system is configured to operate in the emergency mode when the APU controller receives a signal indicating a Total Engine Flame Out (TEFO) or a Loss of Main Electrical Supply (LMES).

8. The redundant auxiliary power system according to claim 1, wherein the aircraft operational parameters are used by the APU controller to control the normal mode or the emergency mode of the APU.

9. An aircraft comprising the redundant auxiliary power system according to claim 1.

10. A method for supplying electric power to an aircraft by a redundant auxiliary power system in the aircraft which includes an auxiliary power unit (APU), a normal electric busbar network, an emergency electric busbar network, a normal starter, an emergency starter, a normal electric power generator and an emergency electric power generator, an electrical power controller and an APU controller operatively,
wherein the method comprises:
operating the redundant auxiliary power system in a normal mode during which the APU controller makes a selection to activate the normal starter or the emergency starter to start the APU, select and activate the normal electric power generator or the emergency electric power generator to be driven by the APU, and select and activate whether power from the selected normal or emergency electric power generator is applied to the normal electric busbar network or the emergency electric busbar network, and
operating in an emergency mode during which the emergency starter is activated by the APU controller to start the APU and the emergency electric power generator is driven by the APU to supply electric power to the emergency electric busbar network.

11. The method of claim 10, further comprising:
activating, during the normal mode, the normal starter by the APU controller to start the APU,
activating, during the normal mode, the normal power generator by the APU controller to be driven by the APU to supply electric power to the normal electric busbar network.

12. The method according to claim 11, further comprising selecting the emergency electric busbar network to be supplied with the electrical power from the normal power generator.

13. The method according to claim 10, wherein if the emergency electric power generator is activated, the method further comprises selecting whether the electric power generated by the emergency electric power generator is supplied to the normal electric busbar network or the emergency electric busbar network.

14. The method according to claim 11, further comprising monitoring operating times of the normal electric power generator and the emergency electric power generator, and
selecting to activate the normal electric power generator or the emergency electric power based on the operating times.

15. The method according to claim 11, wherein:
detecting a malfunction of the normal starter and deactivating the normal starter or detecting a malfunction of the emergency starter and deactivating the emergency starter, and in response to the deactivation of the normal or emergency starter, activating the other of the normal or emergency starter; and/or
detecting a malfunction of and deactivating the normal electrical power generator or detecting of and deactivating the emergency electric power generator, and activating the other of the normal or emergency electric power supply.

* * * * *